United States Patent
Wada (10) Patent No.: US 10,814,810 B2
(45) Date of Patent: Oct. 27, 2020

(54) BUMPER APPARATUS FOR VEHICLE

(71) Applicant: SUBARU CORPORATION, Tokyo (JP)

(72) Inventor: Yoshio Wada, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 61 days.

(21) Appl. No.: 16/254,359

(22) Filed: Jan. 22, 2019

(65) Prior Publication Data
US 2019/0291671 A1 Sep. 26, 2019

(30) Foreign Application Priority Data

Mar. 26, 2018 (JP) ................................. 2018-058542

(51) Int. Cl.
| | |
|---|---|
| *B60R 19/26* | (2006.01) |
| *B60R 19/18* | (2006.01) |
| *B60R 19/24* | (2006.01) |

(52) U.S. Cl.
CPC .............. *B60R 19/26* (2013.01); *B60R 19/18* (2013.01); *B60R 2019/247* (2013.01)

(58) Field of Classification Search
CPC ... B60R 19/26; B60R 19/18; B60R 2019/247; B60R 19/34
USPC ........................................................ 293/132
See application file for complete search history.

(56) References Cited

U.S. PATENT DOCUMENTS

| | | | | |
|---|---|---|---|---|
| 3,703,300 | A | * | 11/1972 | Gillund ............... B60R 21/0136 280/735 |
| 5,876,078 | A | * | 3/1999 | Miskech ................. B60R 19/18 293/132 |
| 6,003,934 | A | * | 12/1999 | Usui .................... B62D 21/152 296/187.09 |
| 6,152,521 | A | * | 11/2000 | Hayashi ............... B62D 21/152 296/187.09 |
| 9,598,033 | B1 | * | 3/2017 | Berger .................... B60R 19/18 |
| 2008/0224487 | A1 | * | 9/2008 | Wang ..................... B60R 19/34 293/132 |
| 2010/0164238 | A1 | * | 7/2010 | Nakanishi .............. B60R 19/34 293/132 |

(Continued)

FOREIGN PATENT DOCUMENTS

JP 2015-147536 A 8/2015

*Primary Examiner* — Pinel E Romain
(74) *Attorney, Agent, or Firm* — Troutman Pepper Hamilton Sanders LLP (57) ABSTRACT

A bumper apparatus for vehicle is disposed between a vehicle body frame extending in a front-to-rear direction of a vehicle and a bumper beam extending in a vehicle width direction. The bumper apparatus includes an axial crush member formed in a hollow cylindrical shape and extending in the front-to-rear direction. The axial crush member has a closed cross-section formed by bonding flat band-like flanges provided on a pair of panels to one another. Each of the pair of flanges is formed in a wavelike pattern along the front-to-rear direction while the pair of flanges is bonded to one another. Each of the pair of flanges has a convex surface and a concave surface as bonded surfaces which are arranged alternately in the front-to-rear direction, and a inclined surface as a non-bonded surface which connects the convex surface to the convex surface and is inclined with respect to the front-to-rear direction.

12 Claims, 9 Drawing Sheets

(56) References Cited

U.S. PATENT DOCUMENTS

| | | | |
|---|---|---|---|
| 2012/0175900 A1* | 7/2012 | Rawlinson | B62D 21/152 293/132 |
| 2012/0223536 A1* | 9/2012 | Muskos | B60R 19/18 293/132 |
| 2013/0076051 A1* | 3/2013 | Baldwin | B60R 19/34 293/133 |
| 2015/0021938 A1* | 1/2015 | Bryer | B60R 19/18 293/132 |
| 2015/0291114 A1* | 10/2015 | Borde | B60R 19/30 293/122 |
| 2018/0065670 A1* | 3/2018 | Yamada | B62D 21/02 |
| 2018/0065671 A1* | 3/2018 | Yoshimura | B60R 19/34 |
| 2019/0118748 A1* | 4/2019 | Newcomb | B62D 21/152 |

* cited by examiner

BUMPER APPARATUS FOR VEHICLE

The present application claims priority from Japanese Patent Application No. 2018-058542 filed on Mar. 26, 2018, the entire contents of which are hereby incorporated by reference.

BACKGROUND

1. Technical Field

The present invention relates to a bumper apparatus for vehicle, more specifically to a bumper apparatus for vehicle including an axial crush member formed in a hollow cylindrical shape disposed between a vehicle body frame and a bumper beam.

2. Related Art

Conventionally, when a bumper beam extending in the vehicle width direction is coupled to a pair of right and left front side frames extending in the front-to-rear direction of the vehicle, an impact absorbing member (hereinafter referred to as "crush box") is disposed between the bumper beam and the front side frames.

As a kind of crash box, there has been known a hollow cylindrical crush box made of a steel plate which is formed by welding (e.g., spot-welding) flanges provided on a pair of panel members at predetermined intervals while the flanges mate with one another, which disclosed, for example, in Japanese Unexamined Patent Application Publication (JP-A) No. 2015-147536.

SUMMARY OF THE INVENTION

An aspect of the present invention provides a bumper apparatus for a vehicle disposed between a vehicle body frame extending in a front-to-rear direction of the vehicle and a bumper beam extending in a vehicle width direction. The bumper apparatus includes an axial crush member formed in a hollow cylindrical shape and extending in the front-to-rear direction of the vehicle. The axial crush member has a closed cross-section formed by bonding flat band-like flanges provided on a pair of panels to one another. Each of the pair of flanges is formed in a wavelike pattern along the front-to-rear direction of the vehicle while the pair of flanges is bonded to one another. Each of the pair of flanges has a convex surface and a concave surface as bonded surfaces which are arranged alternately in the front-to-rear direction of the vehicle, and a inclined surface as a non-bonded surface which connects the convex surface to the convex surface and is inclined with respect to the front-to-rear direction of the vehicle.

DETAILED DESCRIPTION

Hereinafter, an example of the present invention will be described with reference to the drawings. Note that the following description is directed to an illustrative instance of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In general, the crash box is configured to absorb an impact load by axial compression distortion (buckling distortion) upon receiving the impact load via a bumper beam.

Here, in order to efficiently absorb the impact load, it is effective to buckle and distort the crash box in a zig-zag pattern (a proper manner) as possible.

However, as for the crash box disclosed in JP-A No. 2015-147536, the pair of flanges extends along the axial direction. Therefore, when the impact load is applied, the flanges pose an impediment, namely, serve as reinforcing members. Consequently, it may not be possible to properly distort the crush box by axial compression.

In addition, as for the crush box disclosed in JP-A No. 2015-147536, when the vehicle collides with an object at the center of the bumper beam in the vehicle width direction, and then the bumper beam is distorted into a reverse arch shape, a shear stress is applied to the pair of flanges. As a result, in some cases, the welded portions may be broken.

In this case, the crush box cannot function satisfactorily as a member for absorbing collision energy, namely, an impact absorbing member. As a result, the extent of damage of members disposed around the crush box such as a radiator and front side frames may be increased. The same applies to, for example, another type of frontal collision of the vehicle.

Figure 1:
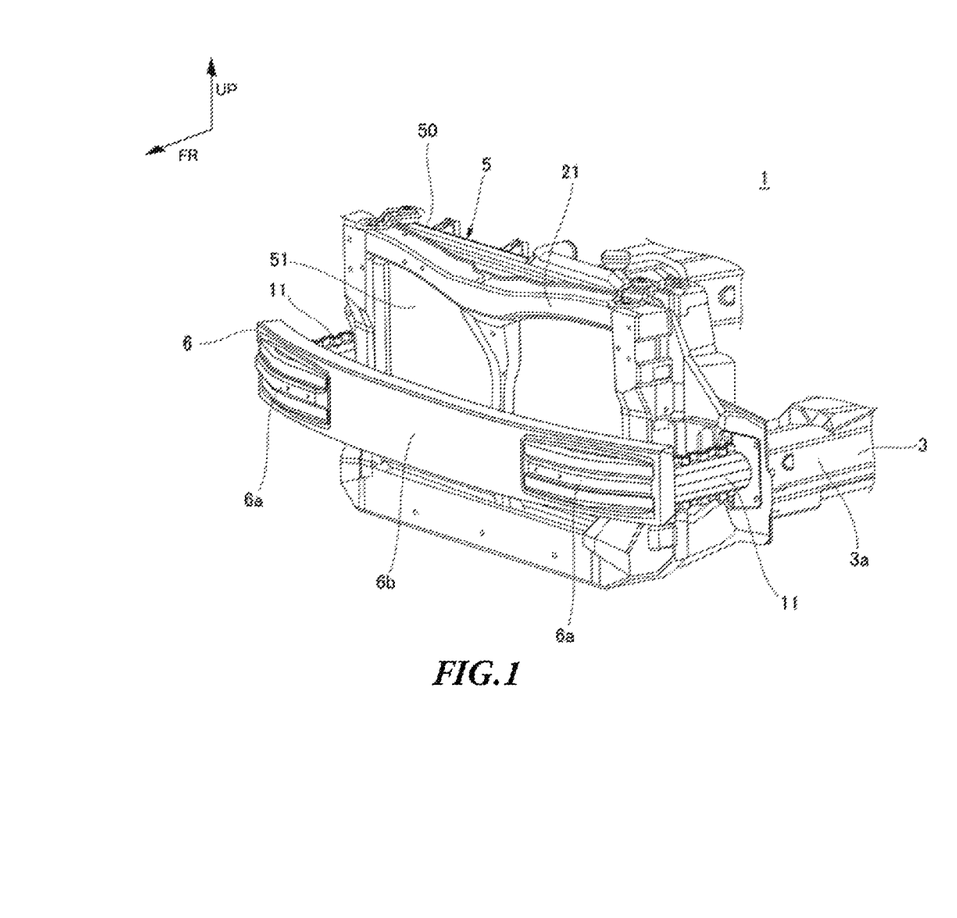
FIG. 1 is a perspective view illustrating a bumper apparatus according to an example of the present invention.
Figure 2:
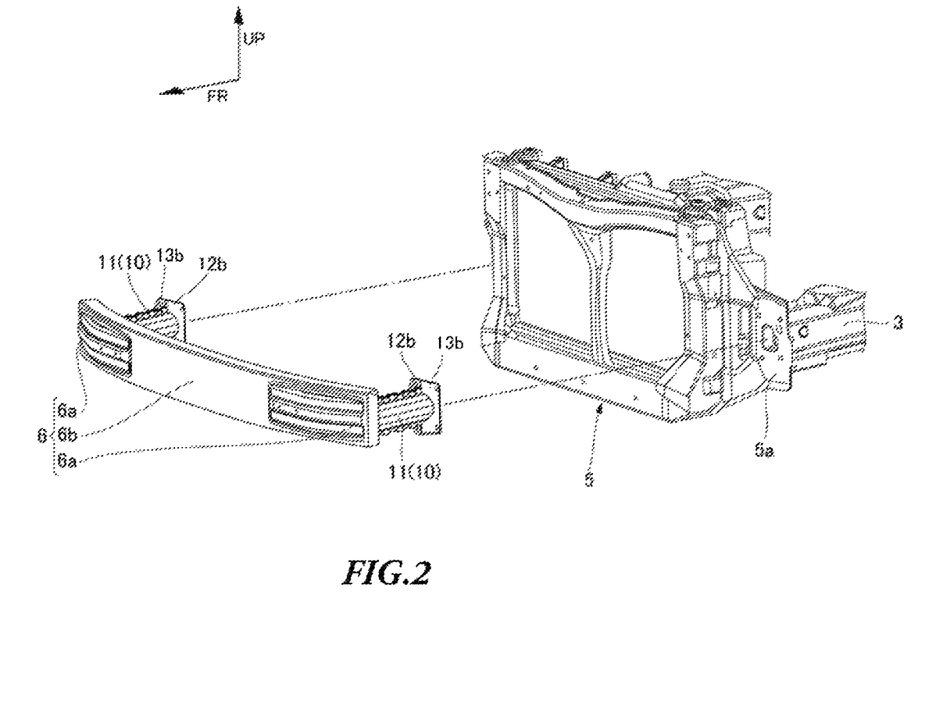
FIG. 2 is an exploded perspective view illustrating the bumper apparatus illustrated in FIG. 1.
Figure 3:
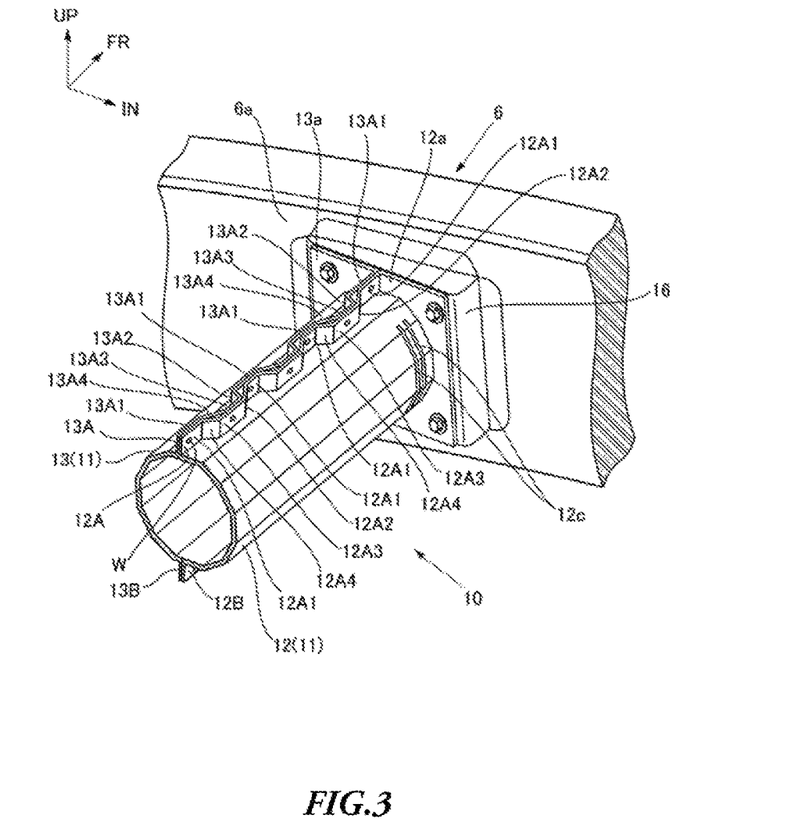
FIG. 3 is a perspective view illustrating an assembled state of a bumper beam and an impact absorber.
Figure 4:
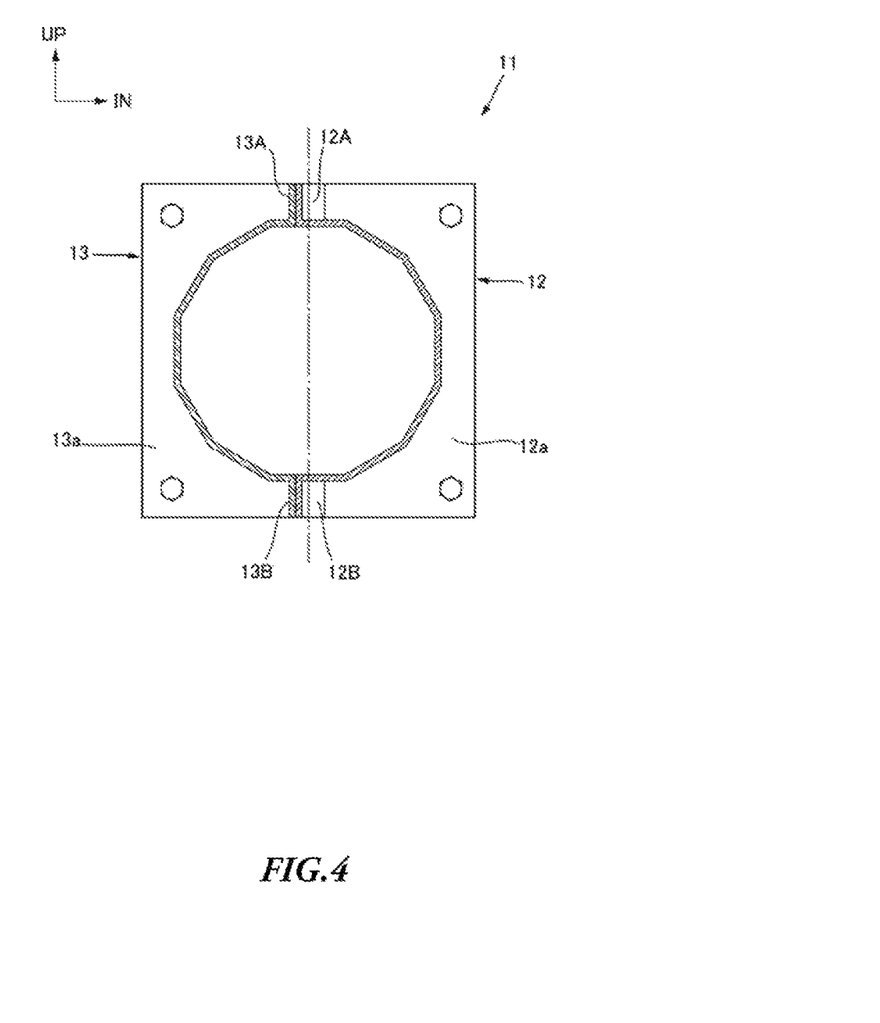
FIG. 4 is a cross-sectional view illustrating the impact absorber.
Figure 5:
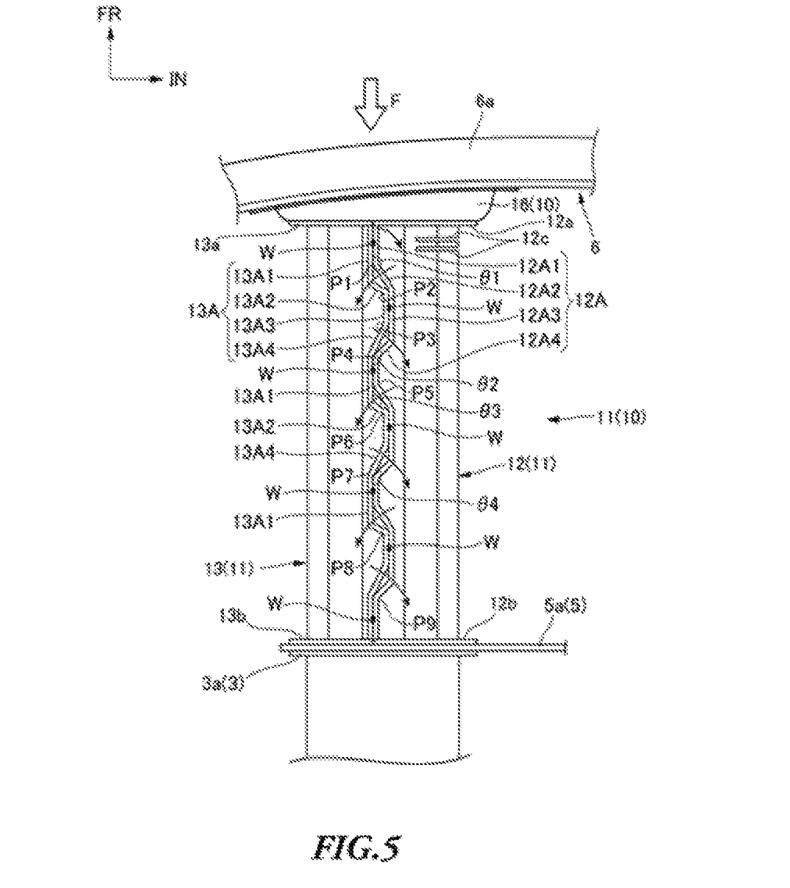
FIG. 5 is a plan view illustrating the impact absorber.
Figure 6:
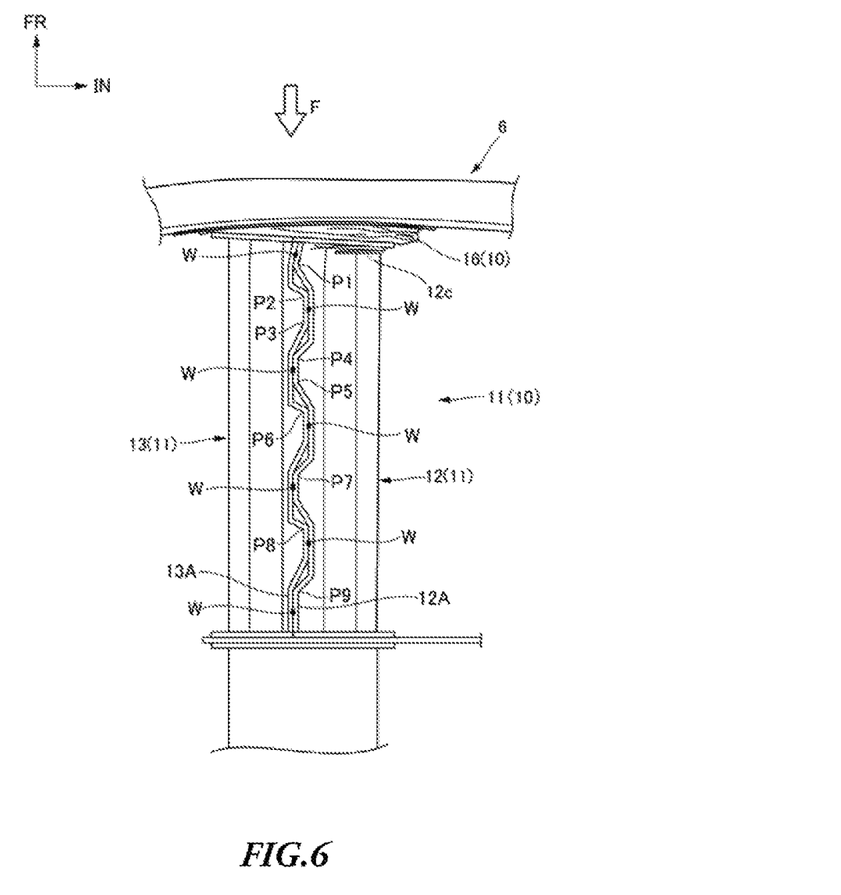
FIG. 6 schematically illustrates a state where an impact load is applied to the impact absorber.
Figure 7:
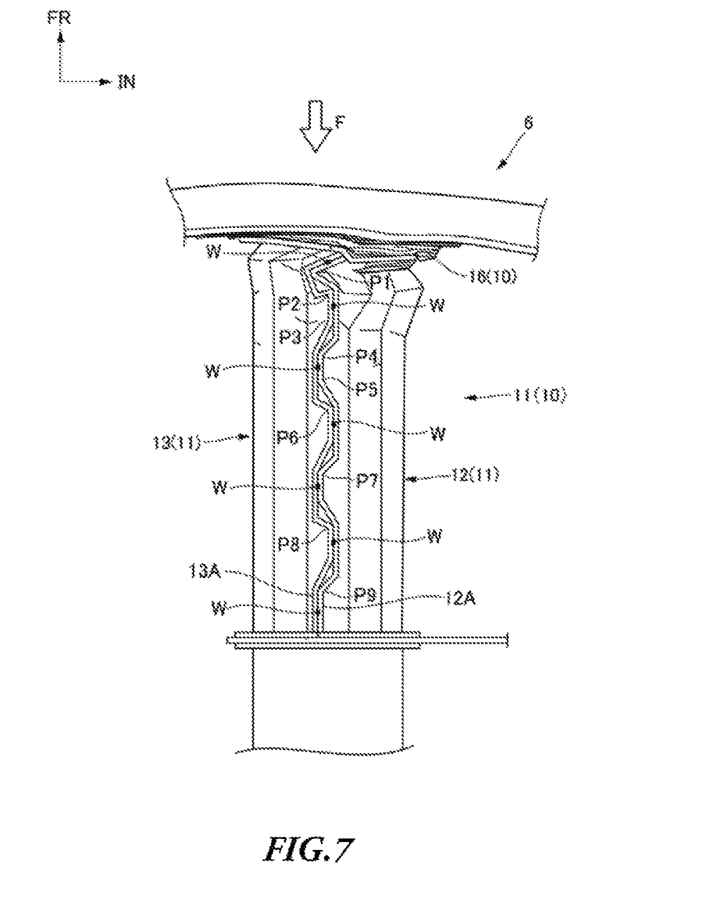
FIG. 7 schematically illustrates a state following the state of FIG. 6.
Figure 8:
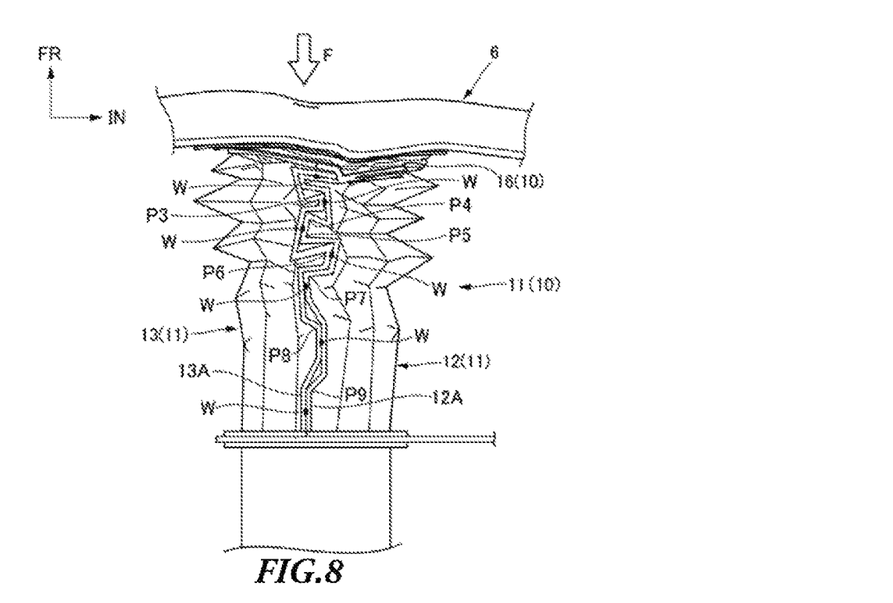
FIG. 8 schematically illustrates a state following the state of FIG. 7.
Figure 9:
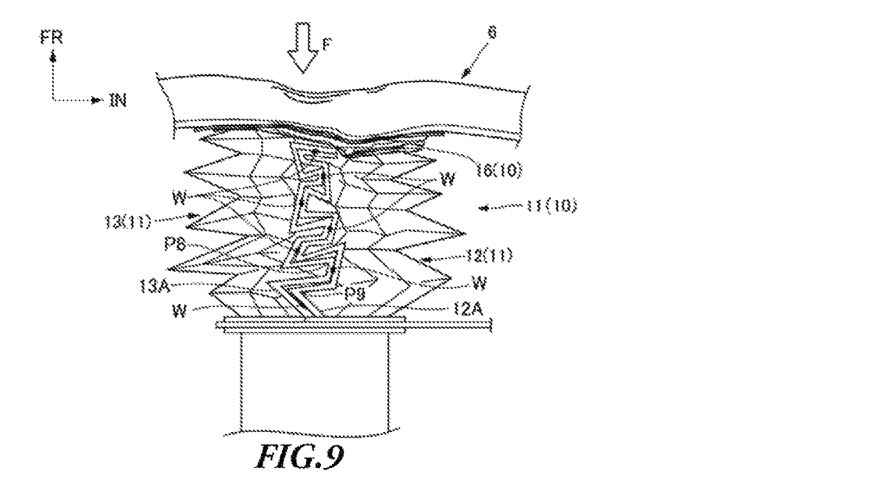
FIG. 9 schematically illustrates a state following the state of FIG. 8.

It is desirable to provide a bumper apparatus capable of properly absorb collision energy. FIG. 1 is a perspective view illustrating a bumper apparatus according to an example of the present invention; FIG. 2 is an exploded perspective view illustrating the bumper apparatus illustrated in FIG. 1; FIG. 3 is a perspective view illustrating an assembled state of a bumper beam and an impact absorber; FIG. 4 is a cross-sectional view illustrating the impact absorber; FIG. 5 is a plan view illustrating the impact absorber; FIG. 6 schematically illustrates a state where an impact load is applied to the impact absorber; FIG. 7 schematically illustrates a state following the state of FIG. 6; FIG. 8 schematically illustrates a state following the state of FIG. 7 and; FIG. 9 schematically illustrates a state following the state of FIG. 8. Here, in the drawings, "FR" denotes front, "UP" denotes upper, and "IN" denotes the vehicle width direction. Hereinafter, "right" and "left" are defined as a passenger faces the front of the vehicle.

With the present example, as illustrated in FIG. 1 and FIG. 2, a vehicle 1 includes a pair of front side frames 3, 3 extending in the front-to-rear direction of the vehicle 1, a bumper beam 6 disposed in front of the pair of front side frames 3, 3, and bumper stays 10, 10 disposed between the pair of front side frame 3 and the bumper beam 6. In one example, the vehicle 1, the front side frame 3, the bumper beam 6, and the bumper stay 10 may serve as a "vehicle", a "vehicle body frame", a "bumper beam", and "bumper apparatus", respectively.

The front side frame 3 is made of a steel plate, and has a rectangular closed cross-section. An impact absorber 11 is fixed to a front end 3a of the front side frame 3 by bolting while a flange 5a of a vehicle equipment support member 5 is sandwiched between the front end 3a and the impact absorber 11. The vehicle equipment support member 5 is configured to support vehicle equipment, for example, a radiator 50 and a condenser 51.

The bumper beam 6 is made of a steel plate and has a rectangular closed cross-section. The bumper beam 6 is provided behind a bumper (not shown) made of, for example, resin, and extends in the vehicle width direction. This bumper beam 6 is curved such that a center part 6b is located forward more than right and left portions 6a, 6a in the vehicle width direction.

Coupling members 16, 16 of the bumper stays 10, 10 are coupled to the rear surfaces of the right and left portions 6a, 6a of the bumper beam 6 in the vehicle width direction, respectively, which will be described later.

Next, the bumper stays 10 will be described with reference to FIGS. 3 to 5. As illustrated in FIGS. 3 to 5, the bumper stay 10 includes the impact absorber 11 attached to one of the pair of front side frames 3, 3 (see FIGS. 1 and 2), and the coupling member 16 configured to attach the impact absorber 11 to the bumper beam 6. Here, the bumper stays 10, 10 attached to the pair of front side frames 3, 3, respectively have approximately the same configuration, and therefore, the right bumper stay 10 will be described, and the description of the left bumper stay 10 is omitted for simplicity.

First, the impact absorber 11 will be described. The impact absorber 11 is made of a steel plate, and includes an inward member 12 faces inward in the vehicle width direction, and an outward member 13 faces outward in the vehicle width direction. In one example, the impact absorber 11 may serve as an "axial crush member".

Each of the inward member 12 and the outward member 13 has an approximate hat-shaped cross-section. When the inward member 12 and the outward member 13 mate with one another, a hollow cylindrical body with a closed polygonal (dodecagonal) cross-section is formed (see FIG. 4).

The inward member 12 includes a bumper beam attachment 12a provided at its front end to attach the coupling member 16, and a side frame attachment 12b provided at its rear end to couple to the flange 5a of the vehicle equipment support member 5. Also, the outward member 13 includes a bumper beam attachment 13a and a side frame attachment 13b in the same way as the inward member 12.

With the present example, two slits 12c are formed on the side surface of the inward member 12 in the front side of the vehicle along the circumferential direction of the inward member 12. The slits 12c are used for the buckling distortion of the impact absorber 11 beginning at the slits 12c when an impact load F is applied from the front side of the vehicle, which will be described later. In one example, the slits 12c may serve as a "fragile portion".

Moreover, the inward member 12 includes an upper flange 12A and a lower flange 12B extending in the opposite directions from the ends in its circumferential direction and bending. The outward member 13 includes an upper flange 13A and a lower flange 13B in the same way as the inward member 12.

The inward member 12 and the outward member 13 are bonded by welding (spot-welding) predetermined portions while the upper flange 12A of the inward member 12 and the upper flange 13A of the outward member 13 overlap one another and the lower flange 12B of the inward member 12 and the lower flange 13B of the outward member 13 overlap one another. Here, the upper flange 12A and the lower flange 12B have the same configuration, and also the upper flange 13A and the lower flange 13B have the same configuration, and therefore, hereinafter the upper flange 12A and the upper flange 13A will be described, and the description of the lower flange 12B and the lower flange 13B is omitted.

The upper flange 12A of the inward member 12 includes an outward flange 12A1, an inwardly inclined flange 12A2, an inward flange 12A3 located inward more than the outward flange 12A1 in the vehicle width direction, and an outwardly inclined flange 12A4. With the present example, these flanges are arranged from one end of the upper flange 12A in the front side of the vehicle 1 in the following order three times: the outward flange 12A1, the inwardly inclined flange 12A2, the inward flange 12A3, and the outwardly inclined flange 12A4; and the outward flange 12A1 is disposed once again at the other end of the upper flange 12A in the rear side of the vehicle 1. That is, only the outward flange 12A1 is disposed four times.

The outward flange 12A1 extends in the front-to-rear direction of the vehicle 1; and the inwardly inclined flange 12A2 bends from the end of the outward flange 12A1 in the rear side of the vehicle 1 and extends inward in the vehicle width direction toward the rear side of the vehicle 1. The inward flange 12A3 bends from the end of the inwardly inclined flange 12A2 in the rear side of the vehicle 1 and extends toward the rear side of the vehicle 1; and the outwardly inclined flange 12A4 bends from the end of the inward flange 12A3 in the rear side of the vehicle 1 and extends outward in the vehicle width direction toward the rear side of the vehicle 1. In one example, the surface of the outward flange 12A1 which faces outward in the vehicle width direction may serve as a "convex surface"; the surface of the inward flange 12A3 which faces outward in the vehicle width direction may serve as a "concave surface"; and the surface of each of the inwardly inclined flange 12A2 and the outwardly inclined flange 12A4 which faces outward in the vehicle width direction may serve as an "inclined surface".

An angle θ1 formed between the outward flange 12A1 and the inwardly inclined flange 12A2 which faces inward in the vehicle width direction is greater than an angle θ2 formed between the outwardly inclined flange 12A4 and the outward flange 12A1 which faces inward in the vehicle width direction. That is, with the present example, the inwardly inclined flange 12A2 is longer than the outwardly inclined flange 12A4 in the front-to-rear direction of the vehicle 1.

Next, the upper flange 13A of the outward member 13 will be described. Like the upper flange 12A of the inward member 12, the upper flange 13A of the outward member 13 includes an outward flange 13A1, an inwardly inclined flange 13A2, an inward flange 13A3 located inward more than the outward flange 13A1 in the vehicle width direction, and, an outwardly inclined flange 13A4. With the present example, these flanges are arranged to correspond to the upper flange 12A of the inward member 12 from one end of the upper flange 13A in the front side of the vehicle 1 in the following order three times: the outward flange 13A1, the inwardly inclined flange 13A2, the inward flange 13A3, and the outwardly inclined flange 13A4; and the outward flange 13A1 is disposed once again at the other end of the upper flange 13A in the rear side of the vehicle 1. That is, only the outward flange 13A1 is disposed four times.

The outward flange 13A1 extends in the front-to-rear direction of the vehicle 1; and the inwardly inclined flange 13A2 bends from the end of the outward flange 13A1 in the rear side of the vehicle 1 and extends inward in the vehicle width direction toward the rear side of the vehicle 1. The inward flange 13A3 bends from the end of the inwardly inclined flange 13A2 in the rear side of the vehicle 1 and extends toward the rear side of the vehicle 1; and the outwardly inclined flange 13A4 bends from the end of the inwardly inclined flange 13A3 in the rear side of the vehicle 1 and extends outward in the vehicle width direction toward the rear side of the vehicle 1. In one example, the surface of the outward flange 13A1 which faces inward in the vehicle width direction may server as a "convex surface"; the surface of the inward flange 13A3 which faces inward in the vehicle width direction may server as a "concave surface"; and the surface of each of the inwardly inclined flange 13A2 and the outwardly inclined flange 13A4 which faces inward in the vehicle width direction may server as an "inclined surface".

An angle θ3 formed between the outward flange 13A1 and the inwardly inclined flange 13A2 which faces inward in the vehicle width direction is smaller than an angle θ4 formed between the outwardly inclined flange 13A4 and the outward flange 13A1 which faces inward in the vehicle width direction. That is, with the present example, the inwardly inclined flange 13A2 is shorter than the outwardly inclined flange 13A4 in the front-to-rear direction of the vehicle 1, like the inward member 12.

The surfaces of the outward flange 13A1 and the inward flange 13A3 of the outward member 13 contact the surfaces of the outward flange 12A1 and the inward flange 12A3, respectively, while the upper flange 12A of the inward member 12 and the upper flange 13A of the outward member 13 overlap one another.

With the present example, these surfaces in contact with each other (portions W) are spot-welded to bond the inward member 12 to the outward member 13.

In the case where the inward member 12 is bonded to the outward member 13, the bending position on the inward member 12 between the inwardly inclined flange 12A2 and the inward flange 12A3 matches the bending position on the outward member 13 between the inwardly inclined flange 13A2 and the inward flange 13A3; and the bending position on the inward member 12 between the outwardly inclined flange 12A4 and the outward flange 12A1 matches the bending position on the outward member 13 between the outwardly inclined flange 13A4 and the outward flange 13A1. In this state, there is a gap between the inwardly inclined flange 12A2 on the inward member 12 and the inwardly inclined flange 13A2 on the outward member 13, and also there is a gap between the outwardly inclined flange 12A4 on the inward member 12 and the outwardly inclined flange 13A4 on the outward member 13.

The front end (bumper beam attachments 12a, 13a) of the impact absorber 11 is coupled to the bumper beam 6 via the coupling member 16, and the rear end (side frame attachments 12b, 13b) of the impact absorber 11 is coupled to the front side frame 3 via the flange 5a of the vehicle equipment support member 5, while the inward member 12 and the outward member 13 are bonded to one another.

Each of the coupling members 16 is made of a material, for example, aluminium having a lower strength than that of the impact absorber 11, and formed integrally with the impact absorbers 11. The coupling members 16 are fixed to the right and left portions 6a of the bumper beam 6 in the vehicle width direction by welding or bolting.

Next, the behavior of the bumper stay 10 configured as described above when an impact load F applied to the bumper stay 10 will be described with reference to FIGS. 6 to 9. Hereinafter, an exemplary case where the impact load F is applied to the bumper stay 10 in the direction which is the same as the axial direction of the bumper stay 10 will be described for ease of understanding. Here, as described above, the upper flange 12A and the lower flange 12B have the same configuration, and also the upper flange 13A and the lower flange 13B have the same configuration, and therefore, hereinafter the upper flange 12A and the upper flange 13A will be described, and the description of the lower flange 12B and the lower flange 13B is omitted unless it is necessary.

As illustrated in FIG. 6, when the impact load F is inputted to the bumper stay 10 via the bumper beam 6, this impact load F acts on the coupling member 16 made of a material having a lower strength than that of the impact absorber 11. Therefore, when the impact load F is inputted to the bumper stay 10, the coupling member 16 is crushed earlier than when the impact absorber 11 is crushed.

After that, when the impact load F is applied to the bumper stay 10, the buckling distortion of the inward member 12 begins at the slits 12c formed on the side surface of the inward member 12 in the front side of the vehicle 1. At this time, the upper flange 12A and the upper flange 13A bend inward in the vehicle width direction from a bending point P1 located closest to the ends of the upper flange 12A and the upper flange 13A in the front side of the vehicle 1.

After that, the impact load F further applied to the bumper stay 10 is focused on a bending point P2 located behind the bending point P1 (the point where the bending portion of the upper flange 12A matches the bending portion of the upper flange 13A) to bend the upper flange 12A and the upper flange 13A. Then, as illustrated in FIG. 7, the upper flange 12A and the upper flange 13A bend outward in the vehicle width direction from the bending point P2. In this case, also the outward member 13 contacting the bending point P2 is buckled and distorted outward in the vehicle width direction due to rotation moment generated by the bending of the upper flange 12A and the upper flange 13A.

After that, when the impact load F is further inputted to the bumper stay 10, it seems that the impact load F is focused on a bending point P3 located behind the bending point P2 to bend the upper flange 12A and the upper flange 13A. However, the strength at the bending point P3 (the bending position of the outward flange 13 between the inward flange 13A3 and the outwardly inclined flange 13A4) is relatively high for the following reasons: the bending point 3 does not match the bending position of the upper flange 12A between the inward flange 12A3 and the outwardly inclined flange 12A4 which faces inward in the vehicle width direction and is located behind the bending point P3; and the inward flange 12A3 and the outwardly inclined flange 12A4 are arranged to function as reinforcing members. Therefore, the impact load F is not focused on the bending point P3 but a subsequent portion having a lower strength than that of the bending point P3, that is, the impact load F is focused on a bending point P4.

When the impact load F is inputted to the bending point P4, the upper flange 12A and the upper flange 13A bend inward in the vehicle width direction from the bending point P4 as illustrated in FIG. 8. In this case, also the inward member 12 contacting the bending point P4 is buckled and distorted inward in the vehicle width direction due to rotation moment generated by the bending of the upper flange 12A and the upper flange 13A.

After that, the impact load F further inputted to the bumper stay 10 is focused on a subsequent portion, that is, not a bending point P5 but a bending point P6 having a lower strength than that of the bending point P5. By this means, the upper flange 12A and the upper flange 13A bend outward in the vehicle width direction from the bending point P6. In this case, also the outward member 13 contacting the bending point P6 is buckled and distorted outward in the vehicle width direction due to rotation moment generated by the bending of the upper flange 12A and the upper flange 13A (see FIG. 8).

After that, when the impact load F is inputted to the bumper stay 10, the upper flange 12A and the upper flange 13A bend at a bending point P7, a bending point P8, and a bending point P9 in sequence in the same way as described above, and the side surfaces of the inward member 12 and the outward member 13 contacting these bending points are buckled and distorted alternately in the vehicle width direction (see FIG. 9).

In this way, with the present example, when the impact load F is inputted to the bumper stay 10, it is possible to bend the upper flange 12A and the upper flange 13A at the bending points P1, P2, P4 and P6 to P9 in sequence in a zig-zag pattern, and the same applies to the lower flange 12B and the lower flange 13B. As a result, with the present example, it is possible to buckle and distort the surface of the inward member 12 which faces inward in the vehicle width direction and the surface of the outward member 13 which faces outward in the vehicle width direction in a zig-zag pattern without breaking the welded portions W. By this means, it is possible to properly absorb the collision energy.

In addition, with the present example, the upper flange 12A and the upper flange 13A have bending points with a relatively high strength (e.g., the bending point P3), and therefore it is possible to prevent the buckling distortion of the upper flange 12A and the upper flange 13A from the bending point P3 even when the impact load F is applied to the bumper stay 10. That is, with the present example, the upper flange 12A and the lower flange 13A have bending points with a high strength, and therefore it is possible to control the distortion mode of the impact absorber 11, that is, the mode of buckling distortion of the impact absorber 11 in a zig-zag pattern. By this means, it is possible to properly absorb the collision energy.

Moreover, with the present example, the outward flange 12A1 and the outward flange 13A1 are located in the ends of the upper flange 12A and the upper flange 13A in the front side of the vehicle 1. Therefore, it is possible to effectively buckle and distort the impact absorber 11 in the zig-zag pattern.

Figure 10:
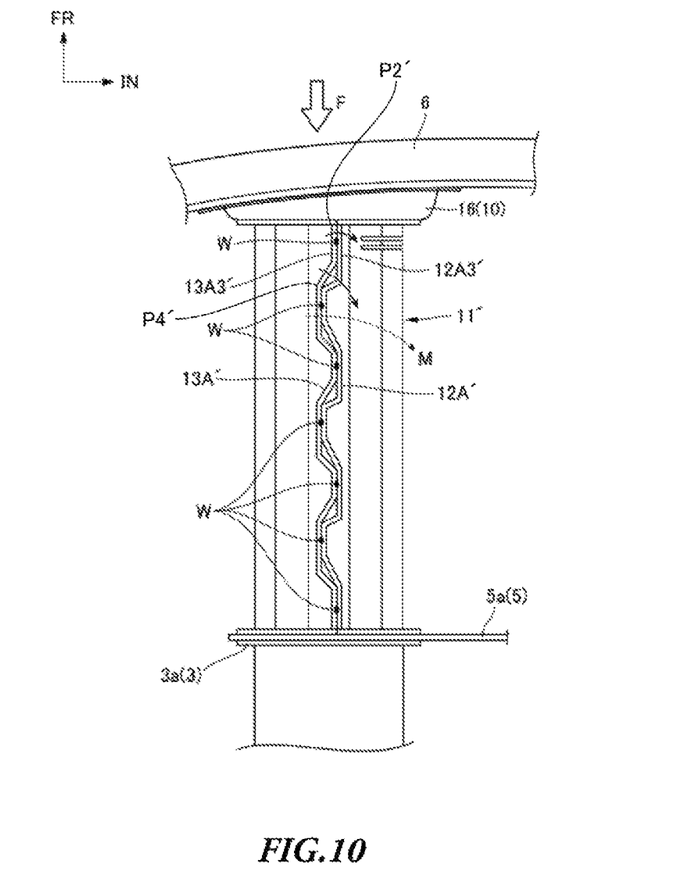
FIG. 10 is a plan view illustrating a comparative example of the impact absorber illustrated in FIG. 5.

It is because, for example, as illustrated in FIG. 10, in a case where an inward flange 12A3' and an inward flange 13A3' are located in the ends of an upper flange 12A' and an upper flange 13A' in the front side of the vehicle 1, when the impact load F is applied to an impact absorber 11', the upper flange 12A' and the upper flange 13A' are bent at a bending point P2', and consequently rotation moment M working inward in the vehicle width direction tends to generate behind the bending point P2'. That is, in a case where the rotation moment M works as described above even though it is originally intended to buckle and distort the impact absorber 11' outward in the vehicle width direction from the bending point P4', it is not possible to buckle and distort the impact absorber 11' in the desired manner, and consequently it is difficult to buckle and distort the impact absorber 11' in the zig-zag manner.

Furthermore, with the present example, the slits 12c are formed on the inward member 12 in the front side of the vehicle 1, and therefore the buckling distortion of the bumper stay 10 can begin at the slits 12c when the impact load F is applied to the bumper stay 10. In this way, with the present example, it makes it easy to buckle and distort the impact absorber 11 in the zig-zag manner.

As described above, the bumper stay 10 according to the present example can properly and effectively absorb the collision energy inputted via the bumper beam 6 even with a simple configuration.

Here, with the present example, in order to form a gap between the inwardly inclined flange 12A2 and the inwardly inclined flange 13A2, and also a gap between the outwardly inclined flange 12A4 and the outwardly inclined flange 13A4, the lengths of the flanges are different from each other. However, this is by no means limiting, and the lengths may be the same as each other.

Moreover, the slits 12c formed on the inward member 12c of the present example may be omitted.

With the present example, the wavelike flanges are provided on the impact absorber 11. However, this is by no means limiting, and flanges may be provided on the coupling member 16 in the same way as the impact absorber 11.

Moreover, with the present example, an exemplary configuration where the present invention applied to the bumper stay 10 provided in the front side of the vehicle 1 has been described. However, this is by no means limiting, and the present invention is applicable to the bumper stay provided in the rear side of the vehicle 1.

Furthermore, with the present example, an exemplary configuration where the impact load F is applied to the bumper stay 10 in the direction which is the same as the axial direction of the bumper stay 10 has been described. However, this is by no means limiting, and when the impact load F is applied to the center of the bumper beam 6 in the vehicle width direction, that is, when the rotation moment is generated to allow the front end of the bumper stay 10 to move inward in the vehicle width direction at the same time when the impact load F toward the rear side of the vehicle 1 applied to the bumper stay 10, it is possible to buckle and distort the impact absorber 11 in the zig-zag pattern, in the same way as the above described example. In this regard, the bumper stay 10 according to the present example can properly absorb the collision energy regardless of the type of a frontal collision.

Here, with the present example, the flanges are provided on the upper portion and the lower portion of the impact absorber 11. However, this is by no means limiting, and the flanges may be provided on other portions, for example, portions located inward and outward in the vehicle width direction.

Moreover with the present example, the impact absorber 11 is composed of two members, the inward member 12 and the outward member 13. However, this is by no means limiting, and the impact absorber 11 may be composed of, for example, three or more members, and a single member.

Although the example of the present invention has been described, it will be appreciated that the present invention is not limited to the descriptions and drawings of the example. Other examples practiced by persons skilled in the art based on the example, and techniques to use the example are covered by the scope of the present invention.

The invention claimed is:

1. A bumper apparatus for a vehicle configured to be disposed between a vehicle body frame extending in a front-to-rear direction of the vehicle and a bumper beam extending in a vehicle width direction, the bumper apparatus comprising:
    an axial crush member formed in a hollow cylindrical shape and extending in the front-to-rear direction of the vehicle, wherein:
    the axial crush member has a closed cross-section formed by bonding a pair of flat band-like flanges provided on a pair of panels to one another;
    each of the pair of flanges is formed in a wavelike pattern along the front-to-rear direction of the vehicle while the pair of flanges is bonded to one another; and
    each of the pair of flanges has a convex surface and a concave surface as bonded surfaces which are arranged alternately in the front-to-rear direction of the vehicle, and a inclined surface as a non-bonded surface which connects the convex surface to the convex surface and is inclined with respect to the front-to-rear direction of the vehicle.

2. The bumper apparatus for vehicle according to claim 1, wherein:
    each of the convex surface and the concave surface is a flat surface extending in the front-to-rear direction of the vehicle; and
    one inclined surface of a pair of inclined surfaces is longer than the other inclined surface in the front-to-rear direction of the vehicle.

3. The bumper apparatus for vehicle according to claim 2, wherein,
    a plurality of pairs of inclined surfaces are provided, and when the pair of inclined surfaces among the plurality of pairs of inclined surfaces is located in the bumper beam side, one inclined surface located inward in the vehicle width direction is longer than the other inclined surface located outward in the vehicle width direction.

4. The bumper apparatus for vehicle according to claim 1, wherein:
    each of the convex surface and the concave surface is a flat surface extending in the front-to-rear direction of the vehicle; and
    a pair of the convex surface and the concave surface is arranged in the pair of the flanges in the bumper beam side; and
    a pair of inclined surfaces connecting the pair of convex surface and concave surface to one another is inclined inward in the vehicle width direction and toward the vehicle body frame.

5. The bumper apparatus for vehicle according to claim 2, wherein:
    a pair of the convex surface and the concave surface is arranged in the pair of the flanges in the bumper beam side; and
    a pair of inclined surfaces connecting the pair of convex surface and concave surface to one another is inclined inward in the vehicle width direction and toward the vehicle body frame.

6. The bumper apparatus for vehicle according to claim 3, wherein:
    a pair of the convex surface and the concave surface is arranged in the pair of the flanges in the bumper beam side; and
    a pair of inclined surfaces connecting the pair of convex surface and concave surface to one another is inclined inward in the vehicle width direction and toward the vehicle body frame.

7. The bumper apparatus for vehicle according to claim 1, wherein a fragile portion is formed in the bumper beam side on a side surface of one panel member of the pair of panel members located inward in the vehicle width direction to cause the pair of panel members to distort in the vehicle width direction.

8. The bumper apparatus for vehicle according to claim 2, wherein a fragile portion is formed in the bumper beam side on a side surface of one panel member of the pair of panel members located inward in the vehicle width direction to cause the pair of panel members to distort in the vehicle width direction.

9. The bumper apparatus for vehicle according to claim 3, wherein a fragile portion is formed in the bumper beam side on a side surface of one panel member of the pair of panel members located inward in the vehicle width direction to cause the pair of panel members to distort in the vehicle width direction.

10. The bumper apparatus for vehicle according to claim 4, wherein a fragile portion is formed in the bumper beam side on a side surface of one panel member of the pair of panel members located inward in the vehicle width direction to cause the pair of panel members to distort in the vehicle width direction.

11. The bumper apparatus for vehicle according to claim 5, wherein a fragile portion is formed in the bumper beam side on a side surface of one panel member of the pair of panel members located inward in the vehicle width direction to cause the pair of panel members to distort in the vehicle width direction.

12. The bumper apparatus for vehicle according to claim 6, wherein a fragile portion is formed in the bumper beam side on a side surface of one panel member of the pair of panel members located inward in the vehicle width direction to cause the pair of panel members to distort in the vehicle width direction.

* * * * *